(12) United States Patent
Wang et al.

(10) Patent No.: US 6,853,610 B2
(45) Date of Patent: Feb. 8, 2005

(54) DETERMINATION OF RECORDING POWER OF RADIATION BEAM FOR RECORDING INFORMATION ONTO RECORDING MEDIUM

(75) Inventors: Wai William Wang, Taoyuan (TW); Tso-Tsai Chen, Taoyuan (TW); Meng-Shin Yen, Taoyuan (TW)

(73) Assignee: Benq Corporation, Taoyuan (TW)

( * ) Notice: Subject to any disclaimer, the term of this patent is extended or adjusted under 35 U.S.C. 154(b) by 231 days.

(21) Appl. No.: 10/073,165

(22) Filed: Feb. 13, 2002

(65) Prior Publication Data

US 2003/0151993 A1 Aug. 14, 2003

(51) Int. Cl.[7] ............................................... G11B 5/09
(52) U.S. Cl. .................... 369/47.51; 369/53.26
(58) Field of Search ........................... 369/47.5, 47.51, 369/47.52, 47.53, 47.55, 53.26, 53.27, 53.3, 53.37, 116

(56) References Cited

U.S. PATENT DOCUMENTS

| | | | | |
|---|---|---|---|---|
| 5,703,841 A | * | 12/1997 | Hiroki | 369/13.24 |
| 5,974,021 A | * | 10/1999 | Toda et al. | 369/116 |
| 6,125,093 A | * | 9/2000 | Toda et al. | 369/116 |
| 6,272,100 B1 | * | 8/2001 | Toda et al. | 369/116 |
| 6,278,667 B1 | * | 8/2001 | Belser | 369/13.01 |

* cited by examiner

*Primary Examiner*—Paul W. Huber
(74) *Attorney, Agent, or Firm*—Ladas & Parry LLP (57) ABSTRACT

The invention is to provide a method for determining a recording power of a radiation beam for recording information onto a recording medium operated at a user-desired speed. According to a preferred embodiment of the method of the invention, under operation of multiple of test speeds in turn, multiple of optimum recording powers which each corresponds to one of the test speeds are determined, respectively. Then, a function of speed is generated by fitting the corresponding optimum recording powers vs. the test speeds. The recording power for the user-desired speed is calculated by applying the user-desired speed in the function of speed.

13 Claims, 5 Drawing Sheets

FIG. 5

DETERMINATION OF RECORDING POWER OF RADIATION BEAM FOR RECORDING INFORMATION ONTO RECORDING MEDIUM

FIELD OF THE INVENTION

The present invention relates to an information recording/reproducing apparatus, such as an optical information recording/reproducing apparatus, utilizing a radiation beam for recording and/or retrieving information onto and/or from a recording medium such as an optical information recording medium, and more in particular, to determination of recording power of the radiation beam for recording information onto the recording medium under operation of a very fast recording speed.

BACKGROUND OF THE INVENTION

Optical information recording media and the like have already used practically for recording/reproducing information by using radiation beams such as laser beams. When information is needed to be recorded and retrieved onto and from an optical information recording medium or the like, an information recording/reproducing apparatus capable of radiating a radiation beam must be applied, namely, an optical information recording/reproducing apparatus or the like is essential.

Before information is formally recorded onto an optical information recording medium or the like, a trial recording procedure is usually undertook to determine an optimum recording power of the radiation beam for recording information onto the optical information recording medium or the like. Many prior arts involving setting of an optimum recording power, when information is recorded upon radiation of a radiation beam such as a laser beam, are disclosed, e.g., U.S. Pat. Nos. 5,703,841, 5,974,021, 6,125,093 and 6,272,100. It is noted that the prior arts regarding setting of an optimum recording power for recording information onto an optical information recording medium are applicable only under operation of slow recording speeds.

Current information recording/reproducing apparatuses utilize a radiation beam for recording and retrieving information onto and from a recording gravitate towards enhancement of the recording speed and reproducing speed, especially for recording speed. Under operation of a fast recording speed, for example, a recording speed faster than 24×recording speed, unstability of driving system of the information recording/reproducing apparatuses would occur, e.g., vibration of the spindle motor set the apparatus. Therefore, it is very difficult and even impossible to determine an optimum recording power for recording information onto an information medium operated at the fast recording speed. However, under operation of a fast recording speed, a trial recording procedure is necessary to assure the quality of recording information more or less. The prior arts for setting of an optimum recording power of a radiation beam for recording information onto an optical information recording medium indicate the need for a new method for determining a recording power of radiation beam for recording information onto the recording medium operated at a fast recording speed, e.g., a recording speed faster than 24×recording speed. The present invention is directed toward satisfying the aforesaid need.

SUMMARY OF THE INVENTION

The prior arts regarding setting of an optimum recording power of a radiation beam for recording information onto an information such as an optical disk cannot be applied when the optical information recording medium is operated at a fast recording speed. However, under operation of a fast recording speed, a trial recording procedure is still necessary to assure the quality of recording information.

An objective of the invention is to provide a method for determining a recording power of a radiation beam for recording information onto an information medium operated at a user-desired speed, and in particular, the user-desired speed is very fast, for example, faster than 24×speed.

According to a preferred embodiment of the invention, a method is provided for determining a recording power for recording information onto a medium operated at a user-desired speed. First, under operation of multiple of test speeds in turn, multiple of optimum recording powers which each corresponds to one of the test speeds are determined, respectively. A function of speed is then generated by fitting the corresponding optimum recording powers vs. the test speeds. Afterward, a step of judgment is performed to judge whether the user-desired speed is equal to anyone of the test speeds. If yes in the step of judgment, the optimum recording power, whose corresponding test speed is equal to the user-desired speed, is determined as the recording power for the user-desired speed. If no in the step of judgment, the recording power for the user-desired speed is determined by applying the user-desired speed in the function of speed. By the method of the invention, the recording power for the user-desired speed can be determined easily and reliably, especially for the user-desired speed that is a very fast recording speed.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

FIG. 1 is a block diagram illustrating the configuration and function elements of an information recording/reproducing apparatus 1 which the invention can be applied to.

DETAILED DESCRIPTION OF THE INVENTION

Figure 1:
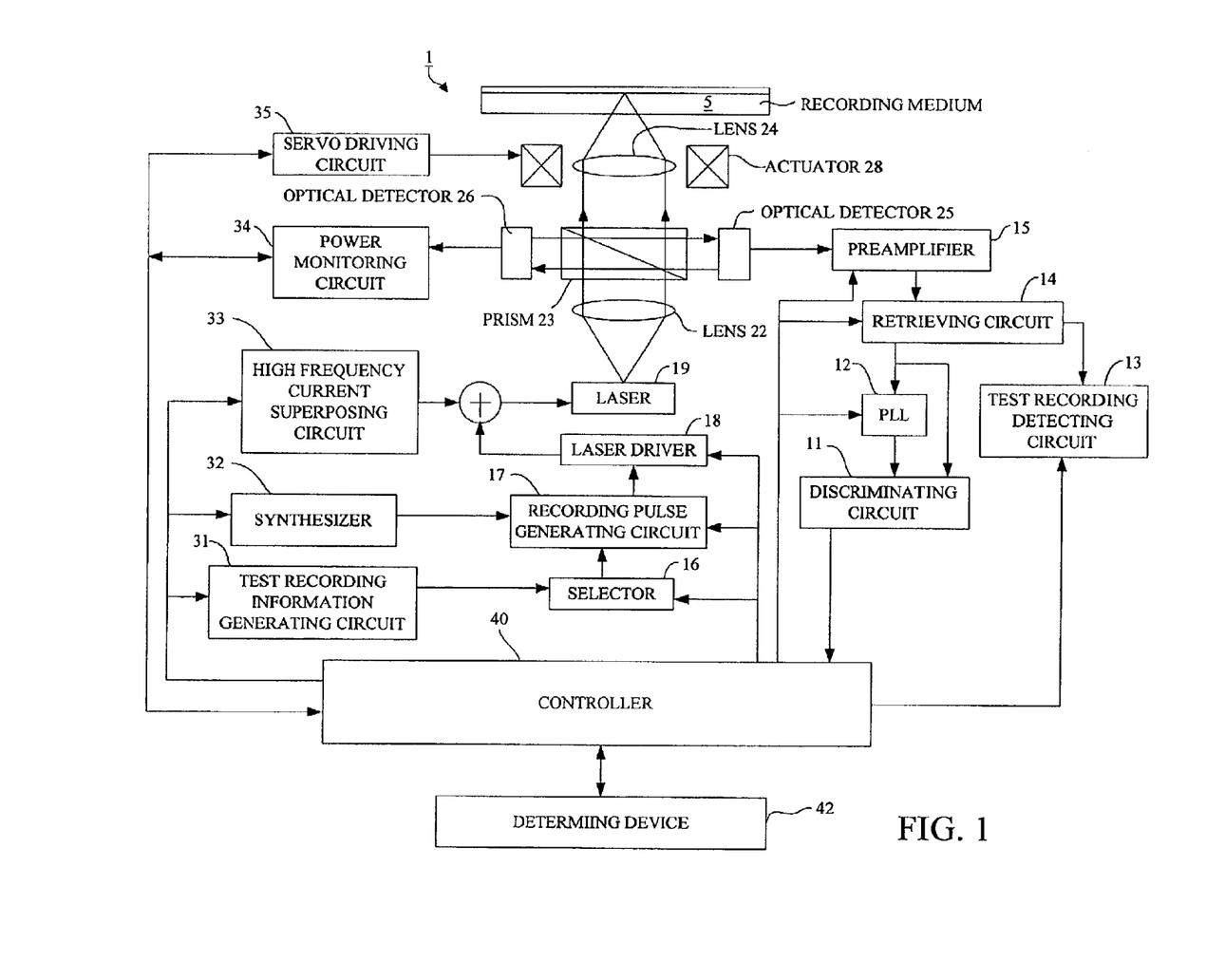

Referring to FIG. 1, the configuration and function elements of an information recording/reproducing apparatus 1, which the invention can be applied to, is depicted. The information recording/reproducing apparatus 1 is of a conventional type, which records optical signals (information patterns) of a suitable recording format, for example standard CD format or RDAT format, onto a recording medium 5. The recording medium 5 may be of a type provided with a radiation-sensitive layer of, for example, a phase-change material or a dye, which layer has been provided with a servo track intended for recording the information patterns.

As shown in FIG. 1, the information recording/reproducing apparatus 1 includes mainly a recording processing device including a recording pulse generating circuit 17 and a retrieving processing device includes a retrieving circuit 14 that converts a retrieved signal obtained from an optical detector 25 into the desired information. Other function elements of the information recording/reproducing apparatus 1 illustrated in FIG. 1 include a laser 19, lenses 22 and 24, optical detectors 25 and 26, a test recording detecting circuit 13, a laser driver 18, a test recording information generating circuit 31, and a controller 40.

With respect to commands and information from a host (not shown), the decoding of such commands and the modulation of information for recording are performed at the controller 40 and then are converted to a code train that corresponds to the modulation process. A synthesizer 32 is an oscillator that generates a standard clock for the apparatus 1. In this case, a recording method called ZCAV (Zoned Constant Angular Velocity) can be used, which is a method of getting a large storing capacity by changing standard clocks at each zone and getting similar recording density at the inner and outer circumference of the recording medium 5, the oscillating frequency of the synthesizer 32 is changed according to the zone.

The kind (or type) of recording medium is judged at the change of the recording medium 5 and the recording and retrieving conditions that conform to that kind of medium are set up. In one embodiment, each condition can be stored in a non-volatile memory of the controller 40. In response to the judgment of the kind of medium, the above described recording and retrieving condition is set up when required by the recording and retrieving processing devices.

In a servo that controls the positioning of an optical spot to perform the recording and retrieving of the information, a focusing error signal and a tracking error signal are obtained with a cylindrical lens (not illustrated) arranged in front of an optical detector 25 (which is divided into four parts).

Before recording regular information, due to various deviations, the test recording information must be recorded onto the recording medium 5 to detect the deviation of the recording sensitivity, etc. The aforesaid deviations generally include the deviation of the film thickness of the recording medium 5 upon change of the recording medium 5, and the deviation of the environmental temperature and the change of characteristics of the recording processing device that records information onto the recording medium 5. As stated above, this is done to improve the conformity of the recording medium 5 with the recording/reproducing apparatus 1.

The test recording information is converted to the code train that corresponds to the modulation process and generated by the test recording information generating circuit 31. It is possible that the test recording information generating circuit 31 generates information other than that of the modulation process and the test recording detecting circuit 13 works in conjunction with such information. Therefore, the test recording process that corresponds to any recording density and recording method using any test recording information can be carried out.

The code train that is modulated corresponding to the regular information from the controller 40 and the code train from the test recording information generating circuit 31 are input to the selector 16, and are switched by the control signal of the controller 40, corresponding to either the test recording process or to the regular recording process. The code train from the selector 16 is input to the recording pulse generating circuit 17 and converted to the recording pulse train to control the length or the width of the recording mark.

This recording pulse train is input to the laser driver 18. The laser 19 is excited to a high power by the recording current from the laser driver 18. The light from the laser 19 is collected by the lens 22 into a parallel ray and goes through a prism 23. The light is focused on the recording medium 5 by the lens 24 to record a recording mark corresponding to the code train. The high frequency current superposing circuit 33 is provided for reducing the laser noise caused by the laser 19 and, considering the life of the laser, the high frequency current superposing circuit 33 is sometimes turned off during recording and erasing.

The laser 19 is excited to an oscillation of low power and the light is radiated to the recording medium 5. The optical path of the reflected light from the recording medium 5 is separated by the prism 23 and the light enters optical detector 25, preferably a photo detector. After the light is photo-electronically converted into a signal at the optical detector 25, it is amplified by the preamplifier 15 and input to the retrieving circuit 14. The retrieving circuit 14 includes a waveform equalizer, an automatic gain control circuit and a binary converting circuit, etc. And the input signal is converted to a binary signal.

The binary signal from the retrieving circuit 14 is input to a PLL (Phase Locked Loop) circuit 12 for self clocking. A retrieving clock signal that is synchronized with the binary signal obtained from the PLL 12 and the binary signal are input to a discriminator circuit 11 for the discrimination of the information. The discriminated information signal that is the output of the discriminator circuit 11 is input to the controller 40 and the information is demodulated.

During the test recording process, the retrieved analog signal from the retrieving circuit 14 is transferred to the test recording detecting circuit 13. As is described in detail hereinafter, the recording pattern that is used for the test recording process is the combination of the densest pattern of the highest frequency and the coarsest pattern of the lowest frequency of the device. The central level of the densest pattern and the central level of the coarsest pattern of the retrieved signal are detected by the test recording detecting circuit 13. The difference between the central levels is input to the A/D converter contained in the controller 40. The recording power, when the difference is almost zero, is judged to be an optimum recording power and regular recording is performed. Thus, with the test recording process, the optimum recording power is set up continually and the recording of a highly precise record mark is enabled.

Figure 2:
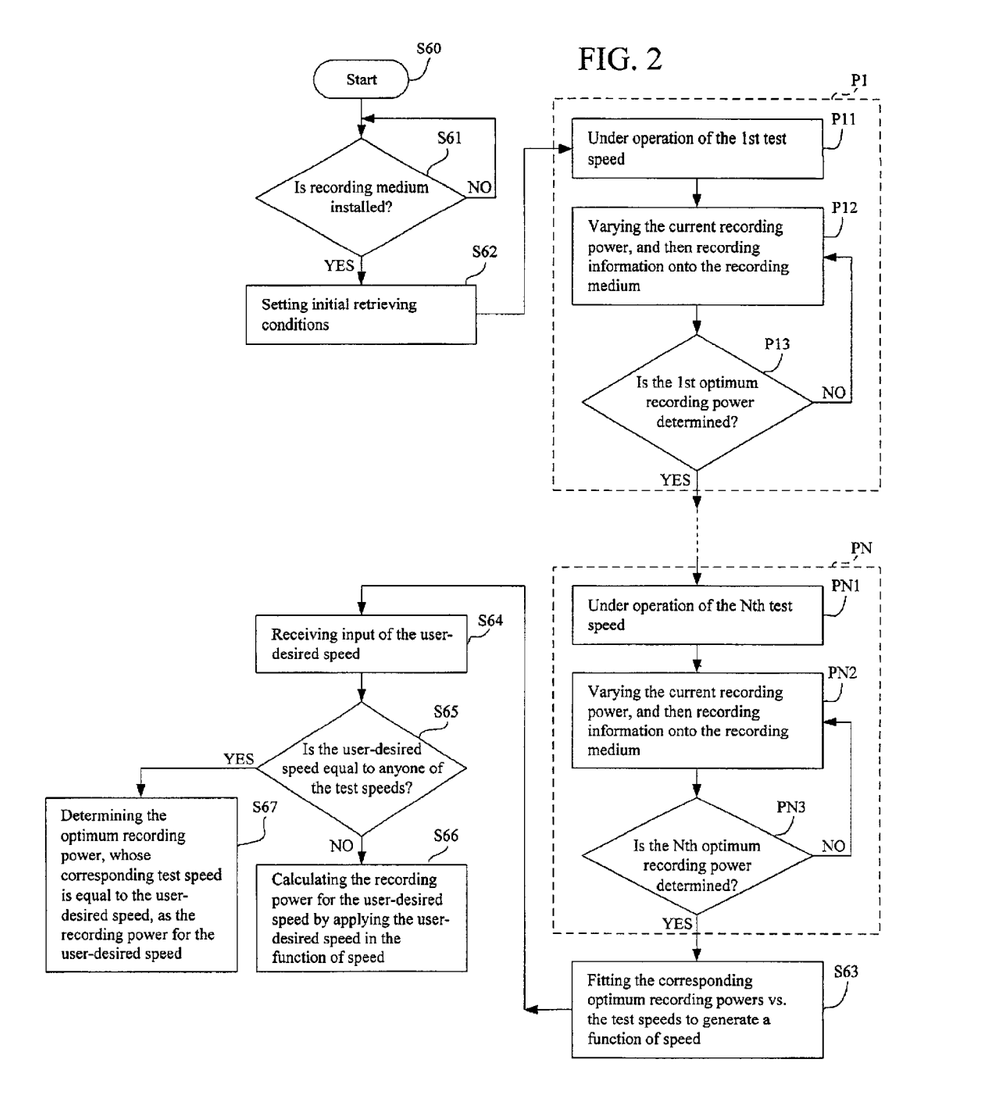
FIG. 2 is a flowchart showing a test recording process according to the preferred embodiment of the invention.

An example of a flowchart of a test recording process according to a preferred embodiment of the invention is illustrated in FIG. 2. The objective of the test recording process is to determine a recording power for recording information onto the recording medium operated at a user-desired speed. By the test recording process according to the invention, the recording power for the user-desired speed can be determined easily and reliably, especially for the user-desired speed that is a very fast recording speed, e.g., a recording speed faster than 24×recording speed. At start, step S60 is performed to, for example, set initial conditions. Afterwards, step S61 is performed to check the install of the recording medium 5 and if the recording medium 5 is not installed, the apparatus 1 remains in stand-by state. When the recording medium 5 is installed, step S62 is then performed. In step S62, an initial retrieving condition is set up to the recording processing device, including the high frequency current superposing circuit 33, the laser driver 18, the power monitor circuit 34 etc., to the retrieving processing device and to the servo driving circuit 35. The recording medium 5 is rotated and the light emission of the laser 19 is turned on. The auto-focusing (AF) for controlling the optical spot on the recording medium 5 with the run out of the recording surface (vertical direction in FIG. 1) is started next. The kind of the recording medium installed to the device is then judged. According to the judgment of the kind of the recording medium, the recording and retrieving conditions are set up to the recording processing device and the retrieving processing device again and tracking to control the optical spot in the direction of the eccentricity of the recording medium 5 and in the direction of radius of the recording medium 5 is started.

Afterwards, N successive test recording procedures (P1 to PN) are performed in turn to determine N optimum recording powers where N is natural number. Moreover, each optimum recording power corresponds to one of the N test speeds. In procedure P1, at start, step P11 is performed to rotate the recording medium under operation of the 1st test speed. Step P12 is then performed to vary a current recording power. And the test information is recorded onto the recording medium while varying the current recording power. Subsequently, step P13 is performed to determine whether the current recording power is judged as the 1st optimum recording power corresponding to the 1st test speed. Determination of the optimum recording power can be implemented, for example, by detecting the recording condition deviation signal that is difference between the central level of the densest pattern and the central level of the coarsest pattern. When the recording condition deviation signal is within the allowable range from the retrieved signal, and when the recording condition deviation signal is almost zero, the recording power is judged as the optimum recording power corresponding to the test speed being operated.

If NO in step P13, step P12 and step P13 are performed in turn until the 1st optimum recording power is determined. If YES in step P13, next test recording procedure is then performed to determine the next optimum recording power. In the same way, the other optimum recording powers are determined respectively in the other procedures (P2 to PN). For the purpose of illustrating the test recording procedures in simplicity, only the first test recording procedure P1 and the last test recording procedure PN are schematically shown in FIG. 2. After finishing the N test recording procedures, the N optimum recording powers are all determined. Afterwards, step S63 is performed to generate a function of speed by fitting the N optimum recording powers vs. the N test speeds. Step S64 is then performed to receive the input of the user-desired speed.

With respect to determining of the recording power for user-desired speed, in one way, step S66 is performed after step S64. In step S66, the recording power for the user-desired is determined by applying the user-desired speed in the function of speed. Alternatively, after step S64, step S65 is then performed to judge whether the user-desired is equal to anyone of the test speeds. If NO in step S65, step S66 is then performed to calculate the recording power for the user-desired speed by applying the user-desired speed in the function of speed. If YES in step S67, step S67 is then performed to determine the optimum recording power, whose corresponding test speed is equal to the user-desired speed, as the recording power for user-desired speed.

In one embodiment, the steps of generating the function of speed and determining of the recording power for the user-desired speed can be implemented in the determining device 42 shown in FIG. 1. In another embodiment, the steps of creating the function of speed and determining of the recording power for the user-desired speed can be implemented in the controller 40 shown in FIG. 1.

Figure 3:
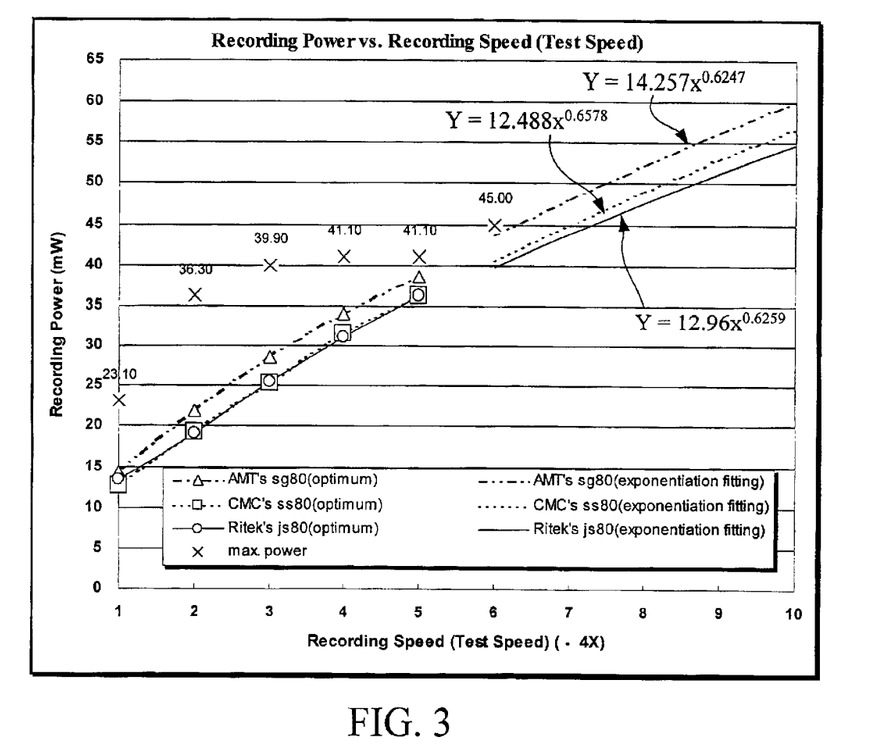
FIG. 3 is a diagram showing the results of the test recording process according to the preferred embodiment of the invention applied to three kinds of popular CD-R disks, and wherein curve fitting in the test recording process is to generate exponential functions.

In one embodiment, the function of speed is an exponential function. An operation of test recording process according to the preferred embodiment of the invention is respectively applied for three kinds of CD-R disks easily bought in market: AMT's sg80, CMC's ss80 and Ritek's js80 which are all capable of recording information under operation of a very fast recording speed. The operation of test recording process is implemented by an optical information recording/reproducing apparatus like the apparatus 1 illustrated FIG. 1. FIG. 3 shows the results of the test recording processes for the aforesaid optical disks. Each fitted curve in FIG. 3. meets with a specific exponential function. In such case, the test speeds, used to determine the corresponding optimum recording powers, are all slower than 24×recording speed. In general, the 24×recording speed is the maximum limit for current information recording/reproducing apparatuses when the prior arts regarding setting of the optimum recording power are applied.

Also shown in FIG. 3, at the test speeds, the maximum recording powers of the information recording/reproducing apparatus are detected, respectively. The maximum recording powers are usually used to erase the recorded test information. Thus, at each recording speed, the optimum recording power or the extrapolated recording power on the fitted curves should be less than the maximum recording power. As shown in FIG. 3, the determined recording powers for the three kinds of optical disks according to the invention can satisfy the aforesaid requirement.

Similarly, in another embodiment, the function of speed in the described above test recording processes is a polynomial function. That is, in the described above test recording processes, the optimum recording powers are used to fit a curve meeting with a polynomial. The results of the test recording processes using polynomial curve fitting are shown in FIG. 4, and each curve meets with a specific polynomial of two orders.

In another embodiment, the function of speed is a function of speed built in an Application such as Microsoft's Excel. Similarly, in the described above test recording processes, each curve is fitted by the built-in function of speed of Excel, and the results of the test recording processes are shown in FIG. 5.

Figure 4:
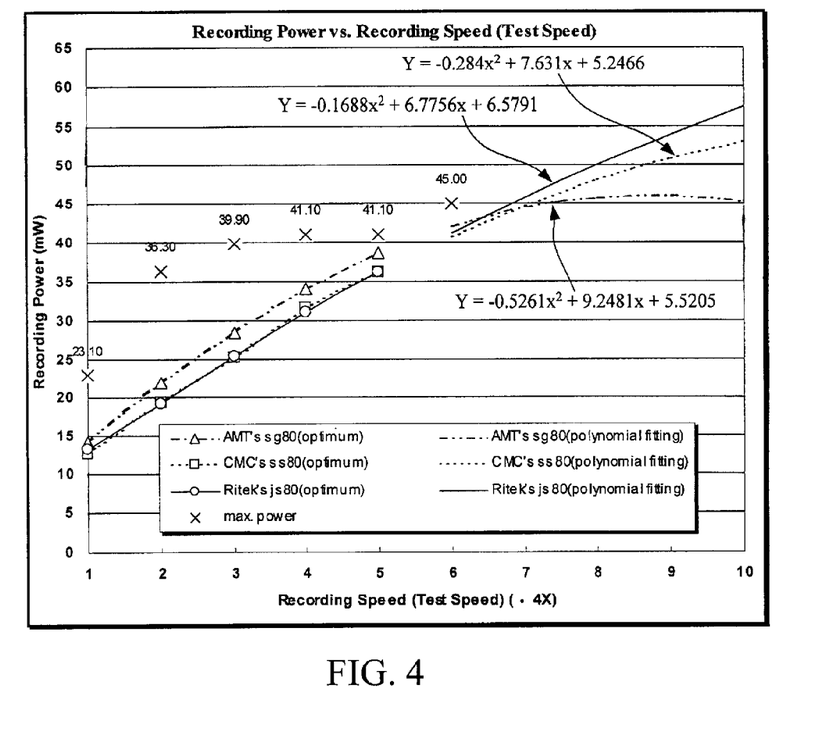
FIG. 4 is a diagram showing the results of the test recording process according to the preferred embodiment of the invention applied to three kinds of popular CD-R disks, and wherein curve fitting in the test recording process is to generate polynomial functions.
Figure 5:
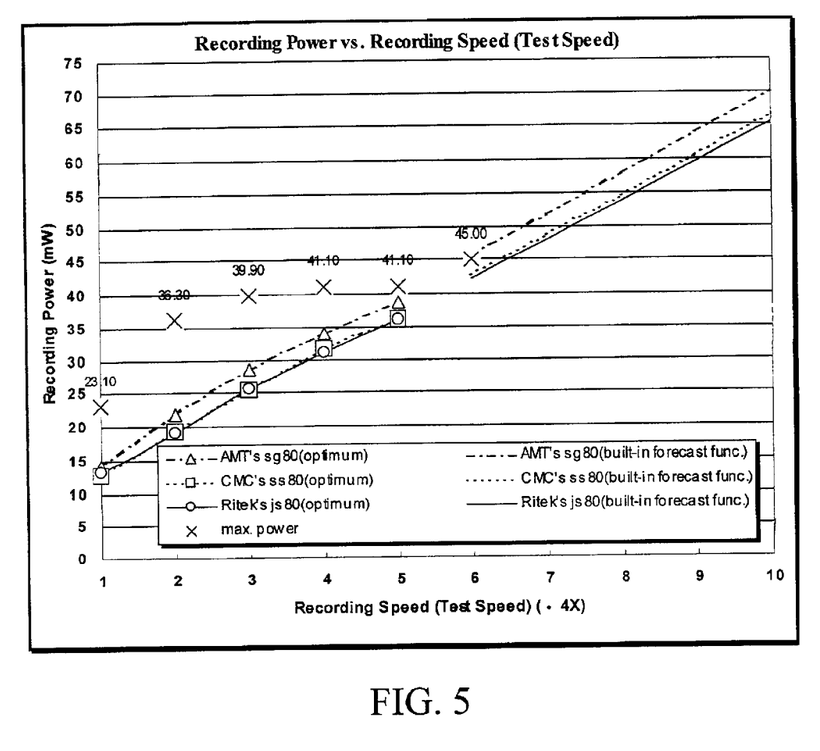
FIG. 5 is a diagram showing the results a diagram showing the results of the test recording process according to the preferred embodiment of the invention applied to three kinds of popular CD-R disks, and wherein curve fitting in the test recording process is by built-in function of speed of Microsoft's Excel.

Referring to TABLE 1, the results of the test recording processes for the CD-R disk of AMT's sg80 shown in FIGS. 3 to 5 are collected and listed in TABLE 1. The optical information, recorded onto the CD-R disk of AMT's sg80 by using the determined recording powers respectively, is then retrieved, and the reliabilities of the recorded optical information are also listed in TABLE 1. As listed in TABLE 1, on one hand, when the user-desired speed is a slower recording speed, i.e., equal to or slower than 24×recording speed, the method of the invention directly detects the optimum recording power and determines the optimum recording power as the recording power for the CD-R disk of AMT's sg80 operated at the user-desired speed. On the other hand, when the user-desired speed is a faster recording speed, i.e., faster than 24×recording speed, the method of the invention takes the calculated recording power as the recording power for the CD-R disk of AMT's sg80 operated at the user-desired speed. As known in prior arts, it is very difficult to determine an optimum recording power for recording optical information onto an optical information medium operated at a fast recording speed. By the method of the invention, the recording powers of the CD-R disk of AMT's sg80 operated at from slower to faster recording speeds can all be determined easily and reliably.

TABLE 1

| recording speed | determining method | determined recording power (mW) | reliability |
|---|---|---|---|
| 4X | A | 14.23 | optimum |
| 8X | A | 21.93 | optimum |
| 12X | A | 28.57 | optimum |
| 16X | A | 34.03 | optimum |
| 20X | A | 38.63 | optimum |
| 24X | A | 42.30 | optimum |
|  | B | 44 | reliable |
|  | C | 42 | reliable |
|  | D | 46 | reliable |
| 28X | B | 48.08 | reliable |
|  | C | 44.48 | reliable |
|  | D | 51.84 | reliable |
| 32X | B | 52.26 | reliable |
|  | C | 45.83 | reliable |
|  | D | 57.93 | reliable |
| 36X | B | 56.25 | reliable |
|  | C | 46.14 | reliable |
|  | D | 64.03 | reliable |
| 40X | B | 60.08 | reliable |
|  | C | 45.39 | reliable |
|  | D | 70.12 | reliable |

A: by detecting the optimum recording power
B: by applying the user-desired speed in the specific exponential function
C: by applying the user-desired speed in the specific polynomial
D: by using Excel's built-in forecast function Referring to TABLE 2, the results of the test recording processes for the CD-R disk of CMC's ss80 shown in FIGS. 3 to 5 are collected and listed in TABLE 2. The optical information, recorded onto the CD-R disk of CMC's ss80 by using the determined recording powers respectively, is then retrieved, and the reliabilities of the recorded optical information are also listed in TABLE 2. As listed in TABLE 2, the method of the invention can determine easily and reliably the recording powers of the CD-R disk of CMC's ss80 operated at from slower to faster recording speeds.

TABLE 2

| recording speed | determining method | determined recording power (mW) | reliability |
|---|---|---|---|
| 4X | A | 12.66 | optimum |
| 8X | A | 19.31 | optimum |
| 12X | A | 25.38 | optimum |
| 16X | A | 31.56 | optimum |
| 20X | A | 36.17 | optimum |
| 24X | A | 39.60 | optimum |
|  | B | 41 | reliable |
|  | C | 41 | reliable |
|  | D | 43 | reliable |
| 28X | B | 44.92 | reliable |
|  | C | 44.75 | reliable |
|  | D | 48.72 | reliable |

TABLE 2-continued

| recording speed | determining method | determined recording power (mW) | reliability |
|---|---|---|---|
| 32X | B | 49.04 | reliable |
|  | C | 48.12 | reliable |
|  | D | 54.65 | reliable |
| 36X | B | 52.99 | reliable |
|  | C | 50.92 | reliable |
|  | D | 60.58 | reliable |
| 40X | B | 56.79 | reliable |
|  | C | 53.16 | reliable |
|  | D | 66.51 | reliable |

A, B, C and D are the same as defined in TABLE 1

Referring to TABLE 2, the results of the test recording processes for the CD-R disk of CMC's ss80 shown in FIGS. 3 to 5 are collected and listed in TABLE 2. The optical information, recorded onto the CD-R disk of CMC's ss80 by using the determined recording powers respectively, is then retrieved, and the reliabilities of the recorded optical information are also listed in TABLE 2. It is preferred noted It is obvious that under operation of a user-desired speed, the optical information, which is recorded onto the CD-R of CMC's ss80 by a recording power determined according to the method of the invention, can achieve satisfactory reliability.

TABLE 3

| recording speed | determining method | determined recording power (mW) | reliability |
|---|---|---|---|
| 4X | A | 13.31 | optimum |
| 8X | A | 19.17 | optimum |
| 12X | A | 25.54 | optimum |
| 16X | A | 31.07 | optimum |
| 20X | A | 36.17 | optimum |
| 24X | A | 40.50 | optimum |
|  | B | 40 | reliable |
|  | C | 41 | reliable |
|  | D | 42 | reliable |
| 28X | B | 43.81 | reliable |
|  | C | 45.74 | reliable |
|  | D | 48.10 | reliable |
| 32X | B | 47.63 | reliable |
|  | C | 49.98 | reliable |
|  | D | 53.86 | reliable |
| 36X | B | 51.27 | reliable |
|  | C | 53.89 | reliable |
|  | D | 59.63 | reliable |
| 40X | B | 54.77 | reliable |
|  | C | 57.46 | reliable |
|  | D | 65.39 | reliable |

A, B, C and D are the same as defined in TABLE 1

Referring to TABLE 3, the results of the test recording processes for the CD-R disk of Ritek's js80 shown in FIGS. 3 to 5 are collected and listed in TABLE 3. The optical information, recorded onto the CD-R disk of Ritek's js80 by using the determined recording powers respectively, is then retrieved, and the reliabilities of the recorded optical information are also listed in TABLE 3. On aspect of technology, it is believed that the method according to the invention is available for other kinds of optical information media.

While the CD-R disks are selected as an example to explain the preferred embodiment of the invention, the invention can be also applied to disk of type of a MD, a MO, a CD-RW, a DVD-R, a DVD-RW, a DVD-RAM and the like. While the invention has been described in the preferred embodiment, it is understood that the words which have been used are words of description rather than words of limitation and that changes within the purview of the appended claims may be made without departing from the scope and spirit of the invention in its broader aspect.

What is claimed is:

1. A method for determining a recording power of a radiation beam for recording information onto a recording medium by an optical drive operated at a user-desired recording speed, said method comprising the steps of:

(a) determining an optimum recording power corresponding to each of a plurality test speeds being operated, respectively;

(b) generating a function of speed based on a relationship between the optimum recording power and the corresponding test speed;

(c) calculating said recording power of the user-desired recording speed by applying said user-desired recording speed in said function of speed; and (d) recording the information onto the recording medium by substantially maintaining and applying said recording power when the optical drive is operated at said user-desired recording speed.

2. The method of claim 1, between step (b) and step (c), further comprising the step of:

(b1) judging whether the user-desired speed is equal to any of the plurality of test speeds;

(b2) if the user-desired speed is not equal to any of the plurality of test speeds then performing step(c); and (b3) otherwise setting the recording power of the user-desired speed as the optimum recording power of a corresponding test speed equal to the user-desired speed and not performing step (c).

3. The method of claim 2, wherein the user-desired speed is faster than all of the plurality of test speeds.

4. The method of claim 1, wherein step (a) comprising:

(a1) recording information onto the recording medium while varying a predetermined recording power;

(a2) receiving a radiation beam reflected from the recording medium during step (a1);

(a3) analyzing the reflected radiation beam to estimate effect of recording information under operation of the test speed being operated; and (a4) changing the predetermined recording power and repeating steps (a1) through (a3) until the optimum recording power of the corresponding test speed is determined.

5. The method claim 4, wherein said function of speed is a polynomial function of at least two orders.

6. The method of claim 4, wherein said function of speed is an exponential function.

7. The method of claim 4, wherein said function of speed is generated by a curve-fitting program.

8. An information recording/reproducing apparatus capable of determining a recording power of a radiation beam for recording information onto a recording medium by an optical drive operated at a user-desired speed, said apparatus comprising:

a recording processing device comprising a radiation generating circuit for recording information onto the recording medium;

a retrieving processing device comprising a radiation detector for receiving the radiation beam reflected from the recording medium during recording information;

a controller, connected to said recording processing device and said retrieving processing device, for determining an optimum recording power corresponding to each of a plurality of test speeds being operated by analyzing the reflected radiation beam to estimate effect of recording information, the controller further fitting the corresponding optimum recording powers versus the plurality of test speeds to generate a function of speed; and a determining device, connected to said controller, for calculating the recording power of the user-defined speed by applying the user-desired speed in the function of speed;

wherein said apparatus records the information onto the recording medium by substantially maintaining and applying said recording power when the optical drive is operational at said user-desired speed.

9. The information recording/reproducing apparatus of claim 8, wherein the user-desired speed is faster than all of the plurality of test speeds.

10. The information recording/reproducing apparatus of claim 8, wherein the determining device also judges whether said user-desired speed is equal to any of the plurality of test speeds, and if the user-desired speed is equal to a corresponding test speed then the controller sets the recording power of the user-desired speed as the optimum recording power of the corresponding test speed and skips applying the user-desired speed in the function of speed.

11. The information recording/reproducing apparatus of claim 10, wherein said function of speed is a polynomial function of at least two orders.

12. The information recording/reproducing apparatus of claim 10, wherein said function of speed is an exponential function.

13. The information recording/reproducing apparatus of claim 10, wherein said function of speed is generated by a curve-fitting program.

* * * * *